No. 620,388. Patented Feb. 28, 1899.
W. WASHBURN.
FISHING REEL.
(Application filed Apr. 1, 1898.)
(No Model.)
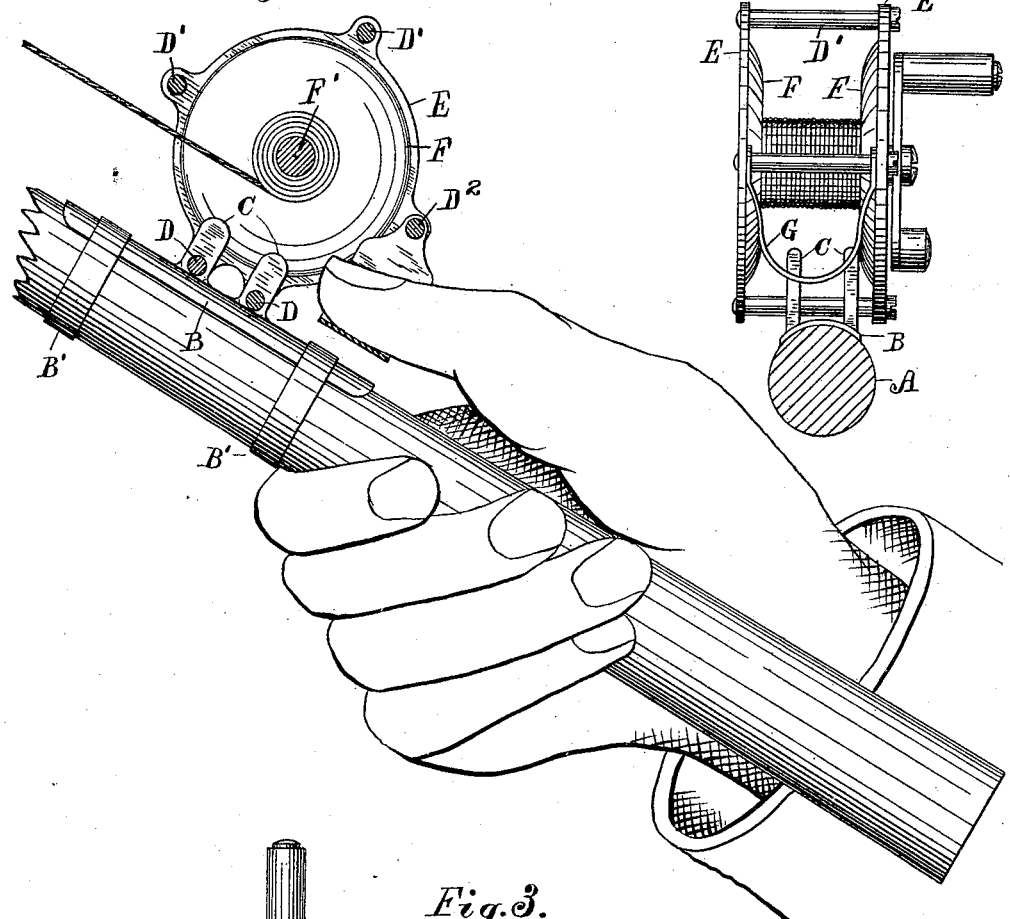
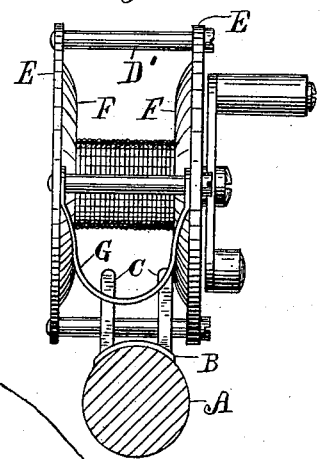
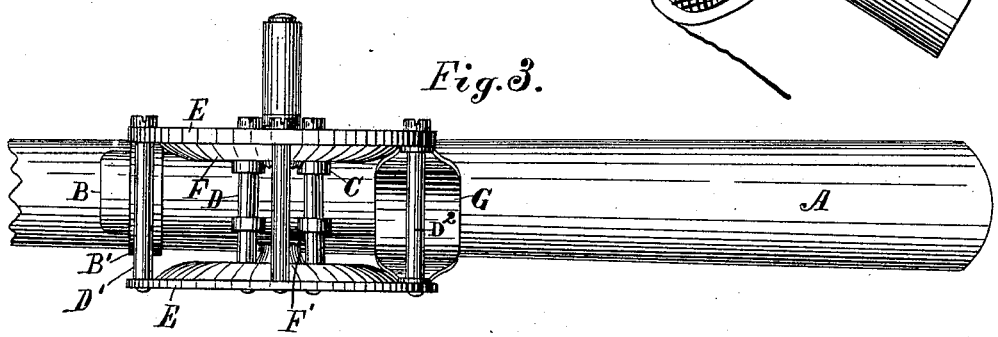
Attest: Inventor.

UNITED STATES PATENT OFFICE.

WICKES WASHBURN, OF NEW YORK, N. Y.

FISHING-REEL.

SPECIFICATION forming part of Letters Patent No. 620,388, dated February 28, 1899.

Application filed April 1, 1898. Serial No. 676,088. (No model.)

*To all whom it may concern:*

Be it known that I, WICKES WASHBURN, a citizen of the United States, residing at New York, county of New York, State of New York, have invented certain new and useful Improvements in Fishing-Reels, fully described and represented in the following specification and the accompanying drawings, forming a part of the same.

The object of the present invention is to furnish a simple and effective brake to the spool of a fishing-reel by which the speed of the reel may be regulated or checked.

Heretofore it has been common to clamp the cage of the fishing-reel rigidly to the fishpole and to provide some device which could be moved by the thumb or finger of the sportsman to retard the movement of the spool.

In the present invention I avoid the use of any distinct braking attachment by making the cage of the reel movable laterally upon lugs carried by the fishpole. These lugs project from the pole between the flanges of the spool, and one or more are made of suitable length to contact with the flange when the cage is moved to the right or to the left by the thumb or finger of the operator. The cage may be moved by applying the thumb to one of the tie-rods of the cage; but a thimble or loop may in the case of large reels be attached to the cage and projected within reach of the thumb to use in moving the cage laterally.

To make the cage move freely upon the supporting-lugs, two tie-rods on one side of the cage are fitted movably to such lugs, and by inclining the tie-rods slightly toward one another or making them tapering the lugs may be made to jam or stick fast upon the tie-rods when one of the lugs is in contact with one of the spool-flanges. The lug is thus held in contact with such flange and serves as a lock to hold the spool from rotation. The lug may be arranged to contact with either the right or left hand flange to suit a left or right handed operator, or lugs may be arranged to operate with both flanges.

The inclined rods are shown in the annexed drawings; but it is obvious that an enlargement of one or both rods at one end would produce the same effect or a spring adapted to hold the cage by friction in its extreme position. A movement of the cage in one direction may thus be employed to regulate the tension upon the line, while a pressure in the opposite direction serves not only to regulate, but to lock, the spool when desired.

The invention will be understood by reference to the annexed drawings, in which—

Figure 1 represents the reel and butt of the pole held in the hand of the fisherman and the nearer half of the reel removed to exhibit the working parts. Fig. 2 is an edge view of the reel with cross-section of the pole, and Fig. 3 is a plan of the pole and reel with the hub F' of the spool broken away between its ends to expose the lugs which sustain the cage movably.

A designates the pole; B, the foot-piece which supports the reel and which is clamped to the pole by the usual rings B'. The foot-piece is provided with four lugs C, fitted movably to two of the tie-rods D upon the reel-cage. The cage is shown with the usual heads E, connected at its base by the two tie-rods D and at several other points by tie-rods D' and $D^2$, the latter lying upon the side of the reel nearest to the hand which is represented as supporting the pole. The spool-flanges F turn inside the heads E, and the lugs C are projected sufficiently inward from the tie-rods D to touch the flanges when the cage is moved laterally. Only a part of the spool-hub F' is shown in Fig. 3. A loop G is attached by its ends to the tie-rod $D^2$ and projects toward the pole, so as to conveniently receive the thumb of the hand which supports the pole, as shown in Fig. 1. The loop furnishes a thumb-piece for shifting the reel-cage laterally to press either of the spool-flanges against the lugs C, the tie-rods D slipping through the lugs when the reel is thus shifted.

A line H is represented in Fig. 1 as running from the spool, and it is obvious that the tension upon such line is increased by pressing either of the revolving spool-flanges against the stationary lugs C, so that the operator can control the speed and tension of the line at pleasure by the movement of the thumb to the right or left, as is most convenient, and can, when desired, permit the line to run off freely by shifting the flanges from contact with any of the lugs.

The tie-rods D are, as shown in Fig. 3, inclined slightly toward one another, so that the lugs become jammed upon the same when the reel is moved to the left, as shown in Figs. 2 and 3. By such disposition of the tie-rods the brake is converted into a lock when the right-hand flange of the spool is pressed against the right-hand lugs C. When the spool is shifted in the reverse direction, the lugs become loose upon the tie-rods, and the left-hand lugs may be used as a brake with the left-hand spool-flange, but cannot operate as a lock to hold the flange against the lug. When the sportsman is desirous to lock the spool, he would therefore press the cage in one direction; but when he wishes to brake the reel without any danger of locking the same he would press it in the opposite direction.

It is desirable to support the cage upon two tie-rods to make it move easily through the lugs C, and by projecting all of the lugs between the spool-flanges it enables the operator to employ either flange to produce a brake; but it is obvious that a part only of the lugs may be projected between the spool-flanges and may be used with one of said flanges to produce both a brake and a lock for the spool.

Where the reel is small, as shown in the drawings, and the tie-rod $D^2$ is not very distant from the pole, the loop G may be dispensed with and the thumb placed upon the tie-rod $D^2$ to move the cage laterally, or a thimble adapted to receive the end of the thumb may be attached to the cage and projected toward the thumb in place of the loop. When the tie-rod is used to receive the pressure of the thumb, it serves as a thumb-piece as well as the loop or thimble referred to.

The construction is exceedingly simple and effective and places the speed and tension of the line perfectly under the control of the fisherman, while it is incapable of derangement and requires no complicated and delicate attachments to operate as a brake.

The essential novelty in the present invention consists in the movability of the reel or its cage upon the pole to bring the brake into operation, and the precise construction of the brake is therefore immaterial, as well as the means employed to lock the cage with the brake pressed upon the flange.

Having thus set forth the nature of the invention, what is claimed herein is—

1. The combination, with a fishing-reel having cage with tie-rods, and spool journaled inside the cage, of a fishing-pole and means for holding the cage movable upon the pole, and a brake actuated by such movement of the cage to check or lock the rotation of the spool, substantially as herein set forth.

2. The combination, with a fishing-reel having a cage with tie-rods, of a pole having the foot-piece B clamped thereon and provided with lugs fitted movably to the tie-rods at one side of the cage, with one or more of such lugs projected between the flanges of the spool, and a thumb-piece attached to the cage for moving the cage laterally, to press the spool-flange against the lug to brake the spool, substantially as herein set forth.

3. The combination, with a fishing-reel having a cage with tie-rods, of the pole A having the foot-piece B clamped thereon and provided with lugs C fitted movably to the tie-rods at one side of the reel with the lugs projected between the flanges of the spool, and the loop G attached to the tie-rod to form a thumb-piece for shifting the cage laterally to operate the brake by pressure of either spool-flange against the lugs, substantially as herein set forth.

4. The combination, with a fishing-reel having a cage with two tie-rods inclined slightly toward one another, of a pole having the foot-piece B clamped thereon and provided with lugs fitted movably to such inclined tie-rods with one or more of such lugs projected between the flanges of the spool, and adapted to brake or lock the spool when the cage is moved laterally and locked by the inclined tie-rods, as set forth.

In testimony whereof I have hereunto set my hand in the presence of two subscribing witnesses.

WICKES WASHBURN.

Witnesses:
 W. H. VAN STERNBERGH,
 JACOB MARX.